US012339130B2

(12) United States Patent
Yokoyama et al.

(10) Patent No.: US 12,339,130 B2
(45) Date of Patent: Jun. 24, 2025

(54) VEHICLE COMMUNICATION CONTROL DEVICE, VEHICLE COMMUNICATION CONTROL METHOD AND NON-TRANSITORY COMPUTER READABLE MEDIUM

(71) Applicant: TOYOTA JIDOSHA KABUSHIKI KAISHA, Aichi-ken (JP)

(72) Inventors: Daiki Yokoyama, Gotemba (JP); Hiroki Murata, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 395 days.

(21) Appl. No.: 18/158,471

(22) Filed: Jan. 24, 2023

(65) Prior Publication Data

US 2023/0236027 A1 Jul. 27, 2023

(30) Foreign Application Priority Data

Jan. 25, 2022 (JP) ................. 2022-009590

(51) Int. Cl.
*G01C 21/34* (2006.01)
*B60W 50/10* (2012.01)
*B60W 50/14* (2020.01)

(52) U.S. Cl.
CPC ......... *G01C 21/3461* (2013.01); *B60W 50/10* (2013.01); *B60W 50/14* (2013.01); *B60W 2050/146* (2013.01)

(58) Field of Classification Search
CPC ...... H04W 4/90; H04W 4/44; G01C 21/3461; B60W 50/14; B60W 50/10; B60W 2050/146
See application file for complete search history.

(56) References Cited

U.S. PATENT DOCUMENTS

| 2020/0160623 | A1 | 5/2020 | Hasegawa et al. | |
| 2023/0156519 | A1* | 5/2023 | Jumonji | G08G 1/00 370/235 |

FOREIGN PATENT DOCUMENTS

| JP | 2006-186625 A | 7/2006 |
| JP | 2013-115720 A | 6/2013 |
| JP | 2014-033280 A | 2/2014 |
| JP | 2017-085516 A | 5/2017 |
| JP | 2018-190606 A | 11/2018 |
| JP | 2019047304 A | 3/2019 |
| JP | 2020-088525 A | 6/2020 |
| JP | 6842142 B1 | 3/2021 |

* cited by examiner

*Primary Examiner* — Wade Miles
(74) *Attorney, Agent, or Firm* — HAUPTMAN HAM, LLP (57) ABSTRACT

A vehicle communication control device includes a processor configured to acquire disaster information, control a communication state between a vehicle and an information distribution server; and restrict communication between the vehicle and the information distribution server when the vehicle is located in a disaster-stricken area.

7 Claims, 11 Drawing Sheets

VEHICLE COMMUNICATION CONTROL DEVICE, VEHICLE COMMUNICATION CONTROL METHOD AND NON-TRANSITORY COMPUTER READABLE MEDIUM

RELATED APPLICATIONS

The present application claims priority of Japanese Patent Application No. 2022-009590 filed Jan. 25, 2022, the disclosure of which is hereby incorporated by reference herein in its entirety.

FIELD

The present disclosure relates to a vehicle communication control device, a vehicle communication control method, and a non-transitory recording medium.

BACKGROUND

In the patent document 1, it is described that the communication of the related users relating to the disaster-stricken area is preferred over the communication of the non-related users other than the related users so that the communication of the related users is not interrupted by the congestion of the network.

CITATIONS LIST

Patent Literature

[PTL 1] Japanese Unexamined Patent Publication No. 2019-047304

SUMMARY

Technical Problem

However, Patent Document 1 does not consider any communication by a vehicle in a disaster-stricken area. Recently, vehicles that communicate with the outside of vehicles using communication device, so-called connected cars, are becoming popular. If communication by such a vehicle is frequently performed in a disaster-stricken area, congestion of a network may be induced, and communication with high urgency by a smartphone or the like may be hindered.

In view of the above problems, an object of the present disclosure is to suppress congestion of a communication line due to vehicle communication in a disaster-stricken area.

Solution to Problem

The summary of the present disclosure is as follows.

(1) A vehicle communication control device comprising a processor configured to: acquire disaster information; control a communication state between a vehicle and an information distribution server; and restrict communication between the vehicle and the information distribution server when the vehicle is located in a disaster-stricken area.

(2) The vehicle communication control device described in above (1), wherein the vehicle communication control device is provided on the vehicle, and the processor is configured to restrict communication from the vehicle to the information distribution server when the vehicle is located in the disaster-stricken area.

(3) The vehicle communication control device described in above (2), wherein the processor is configured to notify an occupant of the vehicle that communication of the vehicle is restricted when restricting communication from the vehicle to the information distribution server.

(4) The vehicle communication control device described in above (2) or (3), wherein the processor is configured to restrict communication from the vehicle to the information distribution server when an occupant of the vehicle permits communication restriction of the vehicle, and not to restrict communication from the vehicle to the information distribution server when the occupant of the vehicle rejects communication restriction of the vehicle.

(5) The vehicle communication control device described in any one of above (2) to (4), wherein the processor is configured not to restrict communication from the vehicle to the information distribution server even if the vehicle is located in the disaster-stricken area when a predetermined person of a younger age group or an older age group is included among occupants of the vehicle.

(6) The vehicle communication control device described in above (1), wherein the vehicle communication control device is provided outside the vehicle.

(7) The vehicle communication control device described in above (6), wherein the processor is configured to instruct the vehicle to restrict communication from the vehicle to the information distribution server when the vehicle is located in a disaster-stricken area.

(8) The vehicle communication control device described in above (6) or (7), wherein the processor is configured to restrict communication from the information distribution server to the vehicle when the vehicle is located in a disaster-stricken area.

(9) The vehicle communication control device described in any one of above (6) to (8), wherein for a plurality of vehicles located in the disaster-stricken area, the processor is configured to restrict communication between a part of the vehicles and the information distribution server and not to restrict communication between the remaining vehicles and the information distribution server.

(10) The vehicle communication control device described in above (9), wherein the processor is configured to increase a ratio of the part of vehicles to the plurality of vehicles when a degree of damage in the disaster-stricken area is large compared to when the degree of damage in the disaster-stricken area is small.

(11) The vehicle communication control device described in above (9) to (10), wherein the remaining vehicles include an emergency vehicle.

(12) The vehicle communication control device described in any one of above (9) to (11), wherein the remaining vehicles include a vehicle on which a predetermined younger or older person is placed.

(13) The vehicle communication control device described in any one of above (9) to (12), wherein the remaining vehicles include a vehicle that can supply power to an outside.

(14) The vehicle communication control device described in any one of above (9) to (13), wherein the remaining vehicles include a vehicle having a degree of damage equal to or greater than a predetermined value.

(15) A vehicle communication control method executed by a computer, comprising: obtaining disaster information; and restricting communication between a vehicle and an information distribution server when the vehicle is located in a disaster-stricken area.

(16) A non-transitory recording medium having recorded thereon a computer program for vehicle communication control, the computer program causing a computer to: obtain disaster information; and restrict communication between a vehicle and an information distribution server when the vehicle is located in a disaster-stricken area.

According to the present disclosure, it is possible to a suppress congestion of a communication line due to vehicle communication in a disaster-stricken area.

DESCRIPTION OF EMBODIMENTS

Hereinafter, embodiments of the present disclosure will be described in detail with reference to the drawings. In the following description, like components are denoted by the same reference numerals.

First Embodiment

Figure 1:
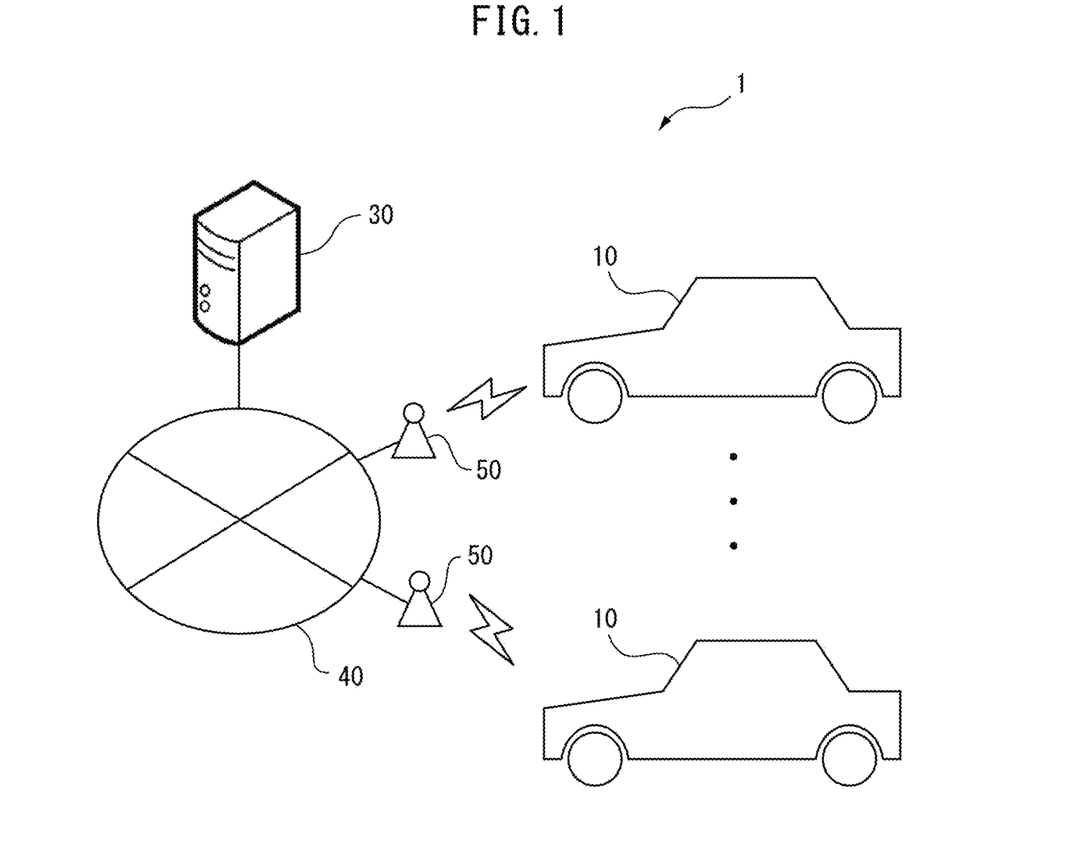
FIG. 1 is a diagram schematically showing a configuration of a vehicle communication system.

First, a first embodiment of the present disclosure will be described with reference to FIGS. 1 to 5. FIG. 1 is a diagram schematically showing a configuration of a vehicle communication system 1. The vehicle communication system 1 includes a plurality of vehicles 10 and an information distribution server 30 provided outside the plurality of vehicles 10.

Each of the plurality of vehicles 10 has a similar configuration. The vehicle 10 is a so-called connected car, and can communicate with the outside of the vehicle 10. In the present embodiment, the vehicle 10 and the information distribution server 30 can communicate with each other via a communication network 40 such as an Internet network and radio base stations 50 connected to the communication network 40. Communication between the vehicle 10 and the radio base station 50 is performed by radio communication techniques such as 3G, LTE, 4G, 5G, etc.

Figure 2:
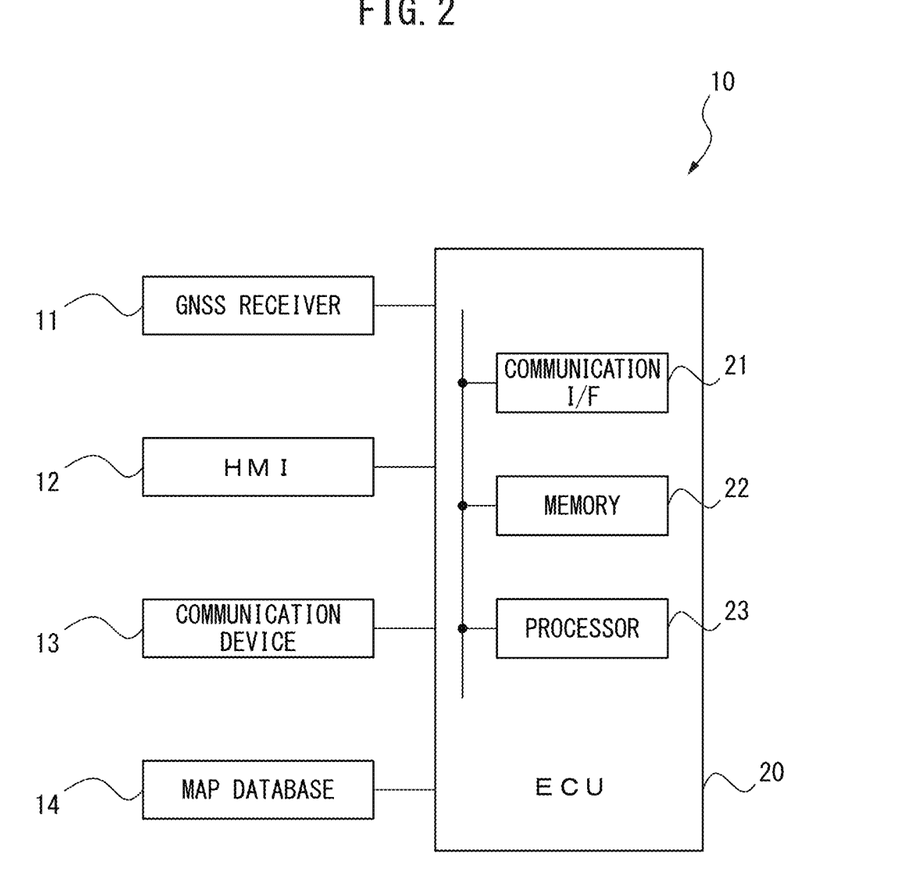
FIG. 2 is a diagram schematically showing a configuration of a vehicle in a first embodiment.

FIG. 2 is a diagram schematically showing a configuration of the vehicle 10 according to the first embodiment. As shown in FIG. 2, the vehicle 10 includes a Global Navigation Satellite System (GNSS) receiver 11, a human-machine interface (HMI) 12, a communication device 13, a map database 14, and an electronic control unit (ECU) 20. The GNSS receiver 11, the HMI 12, the communication device 13, and the map database 14 are communicably connected to the ECU 20 via in-vehicle networks conforming to standards such as CAN (Controller Area Network).

The GNSS receiver 11, based on the positioning information obtained from a plurality of positioning satellites (e.g., three or more), detects the present position of the vehicle 10 (e.g., the latitude and longitude of the vehicle 10). Specifically, the GNSS receiver 11 captures a plurality of positioning satellites and receives radio waves transmitted from the positioning satellites. Then, the GNSS receiver 11 calculates the distances to the positioning satellites based on the differences between the transmission times and the reception times of the radio waves, and detects the present position of the vehicle 10 based on the distances to the positioning satellites and the positions of the positioning satellites (orbital information). Specific examples of the GNSS receiver 11 include a Global Positioning System (GPS) receiver. The output of the GNSS receiver 11, i.e., the present position of the vehicle 10 detected by the GNSS receiver 11, is transmitted to the ECU 20.

The HMI 12 exchanges information between the vehicle 10 and an occupant (e.g., a driver) of the vehicle 10. The HMI 12 has an output unit for outputting information to the occupant of the vehicle 10 (e.g., a display, a speaker, a vibration unit, etc.), and an input unit (e.g., a touch panel, an operation button, an operation switch, a microphone, etc.) for the occupant of the vehicle 10 to input information. The output of the ECU 20 is notified to the occupant of the vehicle 10 via the HMI 12, and the input from the occupant of the vehicle 10 is transmitted to the HMI 12. The HMI 12 is one example of an input device, an output device, or an input/output device. A portable terminal (smartphone, tablet terminal, or the like) of the occupant of the vehicle 10 may be connected to the ECU 20 by wire or wirelessly so as to be able to communicate therewith, and may function as the HMI 12.

The communication device 13 is capable of communicating with the outside of the vehicle 10 and allows communication between the vehicle 10 and the outside of the vehicle 10. The communication device 13 is configured, for example, as a wide area wireless communication device (e.g., a data communication module (DCM)) that enables wide area wireless communication between the vehicle 10 and the outside of the vehicle 10. The ECU 20 communicates with the outside of the vehicle 10, for example, the information distribution server 30, using the communication device 13.

The map database 14 stores map information. The ECU 20 acquires map information from the map database 14. The map database may be provided outside the vehicle 10, for example, at the information distribution server 30, and the ECU 20 may acquire map information from outside the vehicle 10.

The ECU 20 executes various controls of the vehicle 10. As shown in FIG. 2, the ECU 20 includes a communication interface 21, a memory 22, and a processor 23. The communication interface 21 and the memory 22 are connected to the processor 23 via signal lines. Although one ECU 20 is provided in the present embodiment, a plurality of ECUs may be provided.

The communication interface 21 has an interface circuit for connecting the ECU 20 to in-vehicle networks. The ECU 20 is connected to other in-vehicle devices via the communication interface 21. The communication interface 21 is one example of a communication unit of the ECU 20.

The memory 22 includes, for example, a volatile semiconductor memory and a nonvolatile semiconductor memory. The memory 22 stores computer programs, data, and the like, which are used when various processes are executed by the processor 23. The memory 22 is one example of a storage unit of the ECU 20.

The processor 23 includes one or more CPUs (Central Processing Unit) and peripheral circuits thereof. The processor 23 may further include other arithmetic circuits such as a logical arithmetic unit, a numerical arithmetic unit, or a graphic processing unit.

Figure 3:
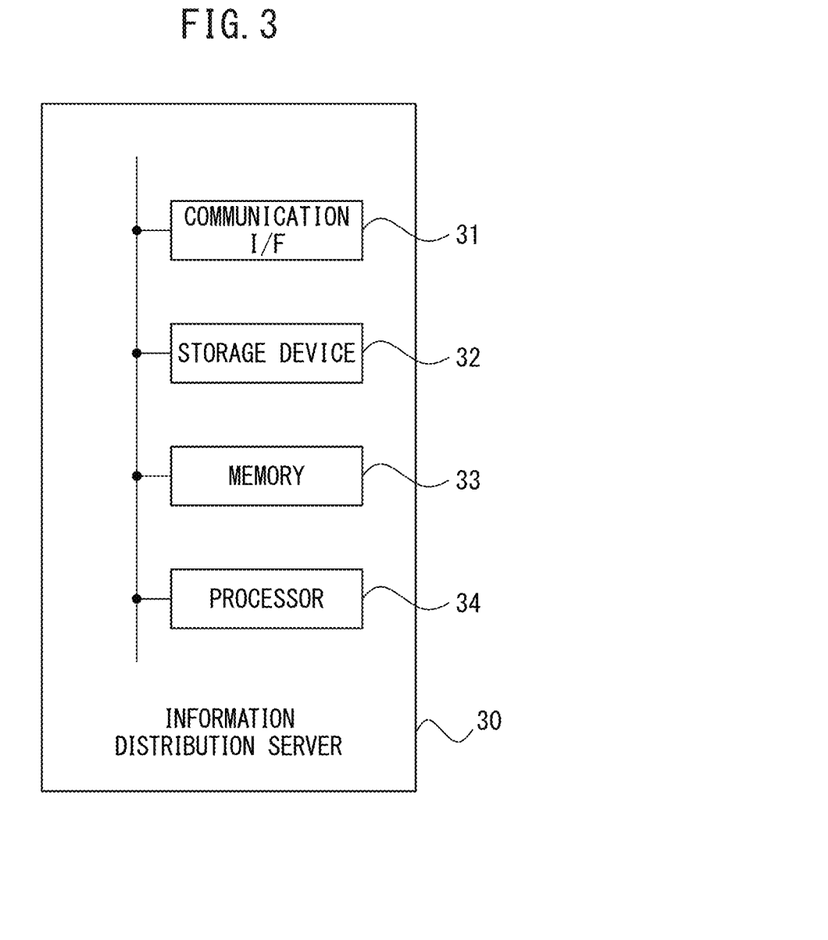
FIG. 3 is a diagram illustrating a configuration of an information distribution server schematically.

FIG. 3 is a diagram schematically illustrating a configuration of the information distribution server 30. The information distribution server 30 includes a communication interface 31, a storage device 32, a memory 33, and a processor 34. The communication interface 31, the storage device 32, and the memory 33 are connected to the processor 34 via signal lines. The information distribution server 30 may further include an input device such as a keyboard and a mouse, an output device such as a display, and the like. Further, the information distribution server 30 may include a plurality of computers.

The communication interface 31 includes an interface circuit for connecting the information distribution server 30 to the communication network 40. The information distribution server 30 communicates with the vehicle 10 via the communication network 40. The communication interface 31 is one example of a communication unit of the information distribution server 30.

The storage device 32 includes, for example, a hard disk drive (HDD), a solid-state drive (SDD), or an optical recording medium and its accessing device. The storage device 32 stores various types of data, and stores, for example, information on the vehicle 10 (identification information, position information, and the like), a computer program for the processor 34 to execute various kinds of processing, and the like. The storage device 32 is one example of a storage unit of the information distribution server 30.

The memory 33 includes a volatile semiconductor memory such as RAM. The memory 33 temporarily stores, for example, various data used when various processing is executed by the processor 34. The memory 33 is another example of a storage unit of the information distribution server 30.

The processor 34 includes one or a plurality of CPUs and peripheral circuits thereof, and executes various processes. The processor 34 may further include other arithmetic circuits such as a logical arithmetic unit, a numerical arithmetic unit, or a graphic processing unit. The processor 34 is one example of a control unit of the information distribution server 30.

The information distribution server 30 can communicate with each of the plurality of vehicles 10, and distribute information to each of the plurality of vehicles 10. For example, the information distribution server 30 transmits various types of information to the vehicle 10 in response to a request signal or the like from the vehicle 10. As a result, the occupant of the vehicle 10 can obtain meaningful information from the outside of the vehicle 10 while the vehicle 10 is traveling.

However, when a disaster occurs in an area where the vehicle 10 is traveling, the amount of communication in the area rapidly increases in order to acquire evacuation information and confirm the safety. Therefore, if communication by the vehicle 10 is frequently performed in such a case, congestion of the network is induced, and there is a possibility that communication with high urgency by a smartphone or the like is hindered. Therefore, in the present embodiment, the vehicle communication control device restricts the communication between the vehicle 10 and the information-distribution server 30 in the disaster-stricken area where the disaster occurred.

Figure 4:
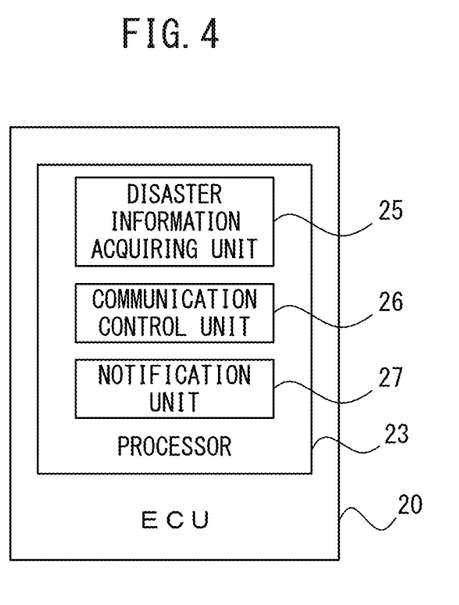
FIG. 4 is a functional block diagram of a processor of an ECU according to the first embodiment.

In the present embodiment, the vehicle communication control device is provided in the vehicle 10, and the ECU 20 of the vehicle 10 functions as the vehicle communication control device. FIG. 4 is a functional diagram of the processor 23 of the ECU 20 according to the first embodiment. In the present embodiment, the processor 23 includes a disaster information acquiring unit 25, a communication control unit 26, and a notification unit 27. The disaster information acquiring unit 25, the communication control unit 26, and the notification unit 27 are function modules implemented by executing a computer program stored in the memory 22 of the ECU 20 by the processor 23 of the ECU 20. These functional modules may be realized by a dedicated arithmetic circuit provided in the processor 23.

The disaster information acquiring unit 25 acquires disaster information. The disaster information includes information (types of disasters, degree of damage, occurrence areas, etc.) on natural disasters (earthquakes, typhoons, eruptions, floods, tsunamis, heavy rains, heavy snowfall, etc.) and human disasters (traffic accidents, large-scale power outages, etc.). For example, the disaster information acquiring unit 25 acquires disaster information by receiving disaster information from the outside of the vehicle 10 (for example, a public organization such as the Meteorological Agency or the Ministry of Land, Infrastructure, Transport and Tourism, an electric power company, an information distribution server 30, or the like). Incidentally, the disaster information acquiring unit 25 may acquire the disaster information by detecting a disaster based on the output of a detection device provided in the vehicle 10 (e.g., a camera, an acceleration sensor, etc.).

The communication control unit 26 controls a communication state between the vehicle 10 and the information distribution server 30. For example, the communication control unit 26 restricts communication between the vehicle 10 and the information distribution server 30 when the vehicle 10 is located in an area where a disaster has occurred, that is, in a disaster-stricken area. This makes it possible to suppress congestion of the communication line due to vehicle communication in the disaster-stricken area, and thus to reduce occurrence of network congestion in the disaster-stricken area.

Figure 5:
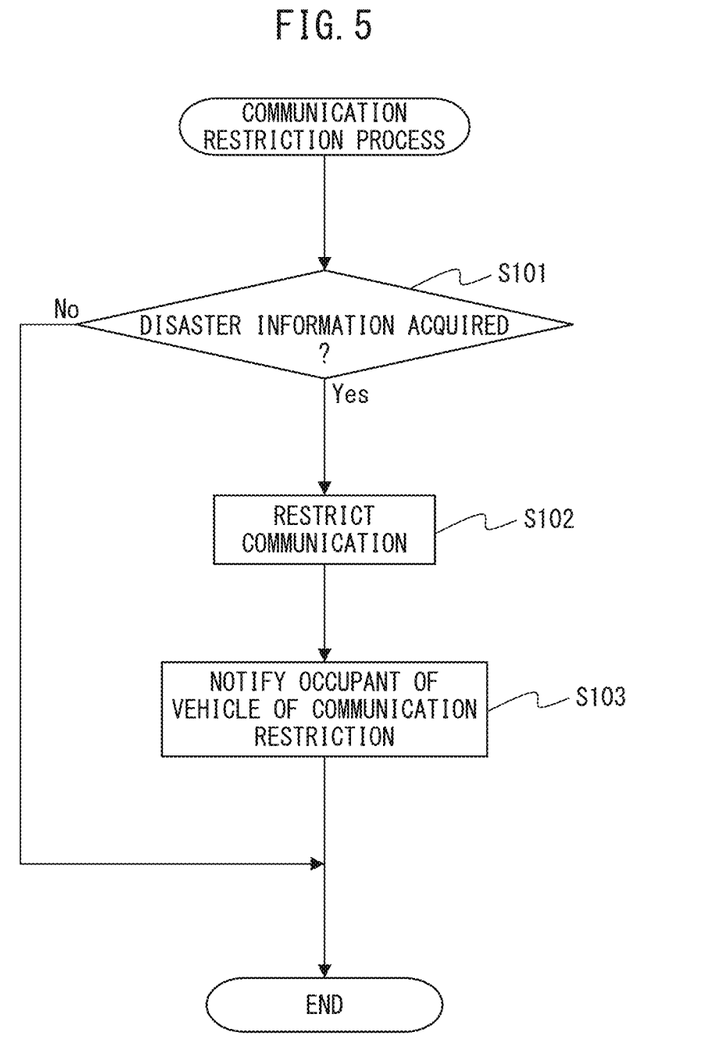
FIG. 5 is a flowchart showing a control routine of a communication restriction process in the first embodiment.

The notification unit 27 notifies the occupant of the vehicle 10 that the communication function of the vehicle 10 is restricted when the communication control unit 26 restricts the communication from the vehicle 10 to the information distribution server 30. This makes it possible for the occupant of the vehicle 10 to recognize that the communication function of the vehicle 10 is intentionally restricted due to the occurrence of a disaster, that is, that the cause of the deterioration of the communication function of the vehicle 10 is not a failure or the like. Hereinafter, the processing flow of the above-described control will be described with reference to the flowchart of FIG. 5. FIG. 5 is a flowchart showing a control routine of the communication restriction process in the first embodiment. The control routine is executed by the processor 23 of the ECU 20 in accordance with a computer program stored in the memory 22 of ECU20.

First, in step S101, the communication control unit 26 determines whether the disaster information about the present position of the vehicle 10 is acquired by the disaster information acquiring unit 25. For example, the communication control unit 26 performs this determination by matching the present position of the vehicle 10 detected by the GNSS receiver 11, and the position of the disaster-stricken area indicated by the disaster information. When the present position of the vehicle 10 is not included in the disaster-stricken area, the determination of step S101 is negative, and the control routine ends. On the other hand, when the present position of the vehicle 10 is included in the disaster-stricken area, the determination of step S101 is affirmative, and the control routine proceeds to step S102. If the disaster information acquiring unit 25 acquires disaster information by detecting a disaster, the determination of S101 of steps is affirmative when a disaster is detected.

In step S102, the communication control unit 26 restricts communication between the vehicle 10 and the information distribution server 30. In the present embodiment, the communication control unit 26 restricts communication from the vehicle 10 to the information distribution server 30. For example, when vehicle information, such as positional information of the vehicle 10, is periodically transmitted from the vehicle 10 to the information distribution server 30, the communication control unit 26 decreases the frequency of communication from the vehicle 10 to the information distribution server 30 or the communication speed or communication amount of data transmitted from the vehicle 10 to the information distribution server 30. In addition, the communication control unit 26 may reduce the communication speed or the communication amount of data transmitted from the vehicle 10 to the information distribution server 30 when the occupant of the vehicle 10 requests acquisition of information. Further, the communication control unit 26 may stop communication from the vehicle 10 to the information distribution server 30 when restricting communication from the vehicle 10 to the information distribution server 30.

Next, in step S103, the notification unit 27 notifies the occupant of the vehicle 10 via the HMI 12 that the communication of the vehicle 10 is restricted. For example, the notification unit 27 displays textual information indicating communication restriction of the vehicle 10, for example, character information such as "Vehicle communication will be restricted due to a disaster" on the HMI 12. In addition to or instead of the character information, the notification unit 27 may cause HMI12 to output audio information indicating the communication restriction of the vehicle 10. That is, the notification unit 27 visually or audibly notifies the occupant of the vehicle 10 of the communication restriction of the vehicle 10 via the HMI 12. After step S103, the control routine ends.

Second Embodiment

The configuration and control of the vehicle communication control device according to the second embodiment are basically the same as the configuration and control of the vehicle communication control device according to the first embodiment, except for the following points. Therefore, the second embodiment of the present disclosure will be described below focusing on portions different from the first embodiment.

When the occupant of the vehicle 10 does not have a communication means other than the vehicle 10, it is conceivable to acquire evacuation information or the like by vehicle communication when a disaster occurs. Therefore, even when a disaster occurs, it is desirable to be able to secure the stability of vehicle communication according to the desire of the occupant of the vehicle 10.

Therefore, in the second embodiment, the communication control unit 26 restricts the communication from the vehicle 10 to the information distribution server 30 when the occupant of the vehicle 10 permits the communication restriction of the vehicle 10, and does not restrict the communication from the vehicle 10 to the information distribution server 30 when the occupant of the vehicle 10 rejects the communication restriction of the vehicle 10. Thus, it is possible to avoid losing the communication means of the occupant of the vehicle 10 at the time of disaster occurrence.

Figure 6:
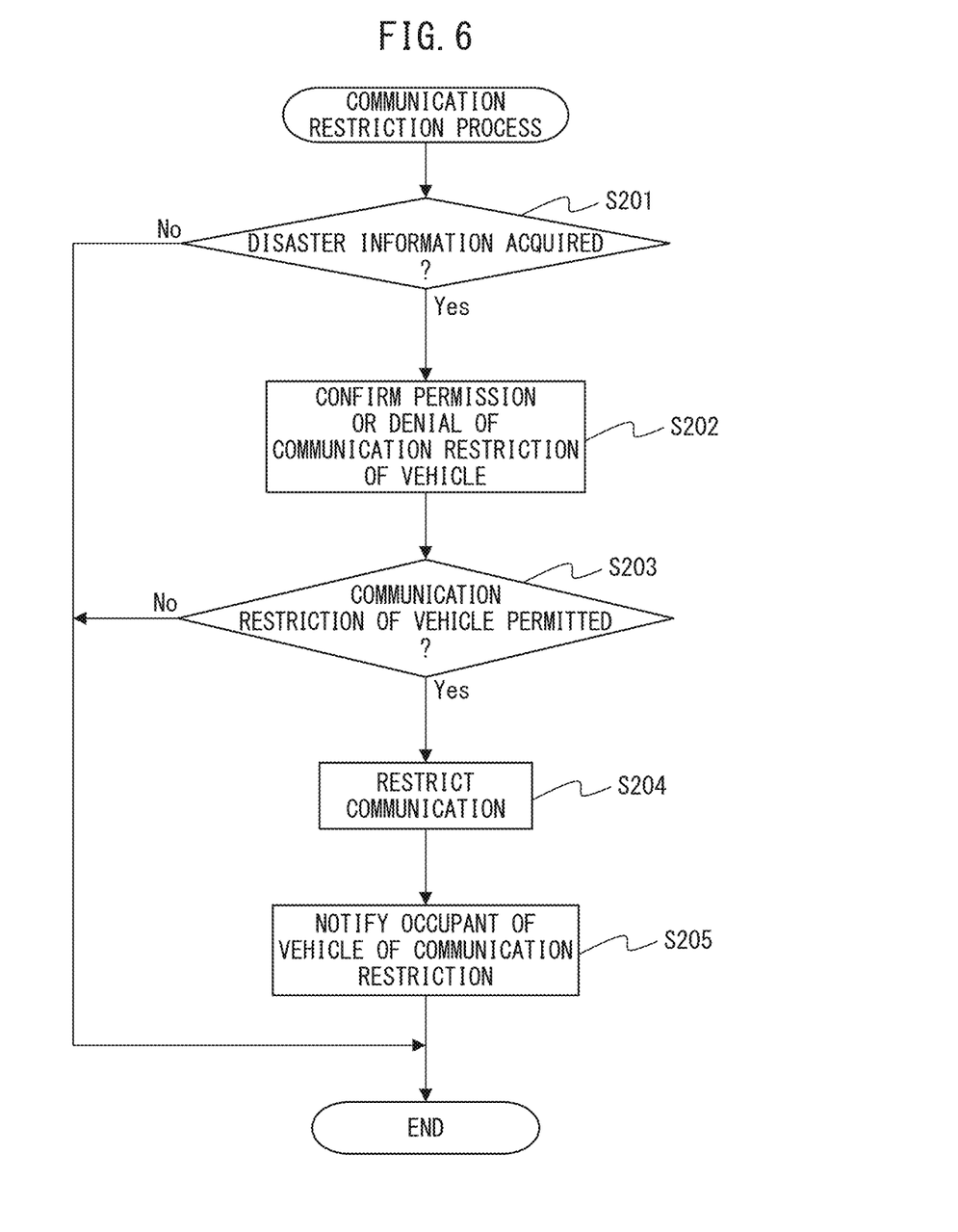
FIG. 6 is a flowchart showing a control routine of the communication restriction process in a second embodiment.

FIG. 6 is a flowchart showing a control routine of the communication restriction process in the second embodiment. The control routine is executed by the processor 23 of the ECU 20 in accordance with a computer program stored in the memory 22 of the ECU 20.

First, in step S201, similarly to the step S101 of FIG. 5, the communication control unit 26 determines whether the disaster information about the present position of the vehicle 10 has been acquired by the disaster information acquiring unit 25. If it is determined that the disaster information has not been acquired, the control routine ends. On the other hand, if it is determined that the disaster information has been acquired, the control routine proceeds to step S202.

Figure 7:
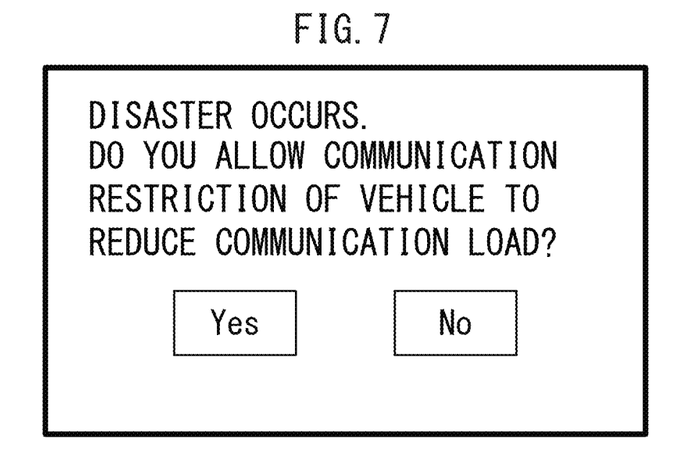
FIG. 7 is a diagram illustrating an example of a confirmation screen for confirming whether or not the communication restriction of the vehicle is allowed to the occupant of the vehicle.

In step S202, the notification unit 27 confirms the permission or denial of the communication restriction of the vehicle 10 to the occupant of the vehicle 10 through the HMI 12. For example, the notification unit 27 displays a confirming screen as shown in FIG. 7 on the HMI 12.

Next, in step S203, the communication control unit 26 determines whether or not the communication restriction of the vehicle 10 is permitted by the occupant of the vehicle 10. When it is determined that the communication restriction of the vehicle 10 is rejected, for example, when No is selected on the confirmation screen of FIG. 7, the control routine ends. On the other hand, when it is determined that the communication restriction of the vehicle 10 is permitted, for example, when "Yes" is selected in the confirming screen of FIG. 7, the control routine proceeds to step S204.

In step S204, similarly to step S102 in FIG. 5, the communication control unit 26 restricts the communication from the vehicle 10 to the information distribution server 30. Next, in step S205, similarly to step S103 of FIG. 5, the notification unit 27 notifies the occupant of the vehicle 10 via the HMI 12 that the communication of the vehicle 10 is restricted. After step S205, this control routine ends.

Third Embodiment

The configuration and control of the vehicle communication control device according to the third embodiment are basically the same as the configuration and control of the vehicle communication control device according to the first embodiment, except for the following points. Therefore, the third embodiment of the present disclosure will be described below focusing on portions different from the first embodiment.

Figure 8:
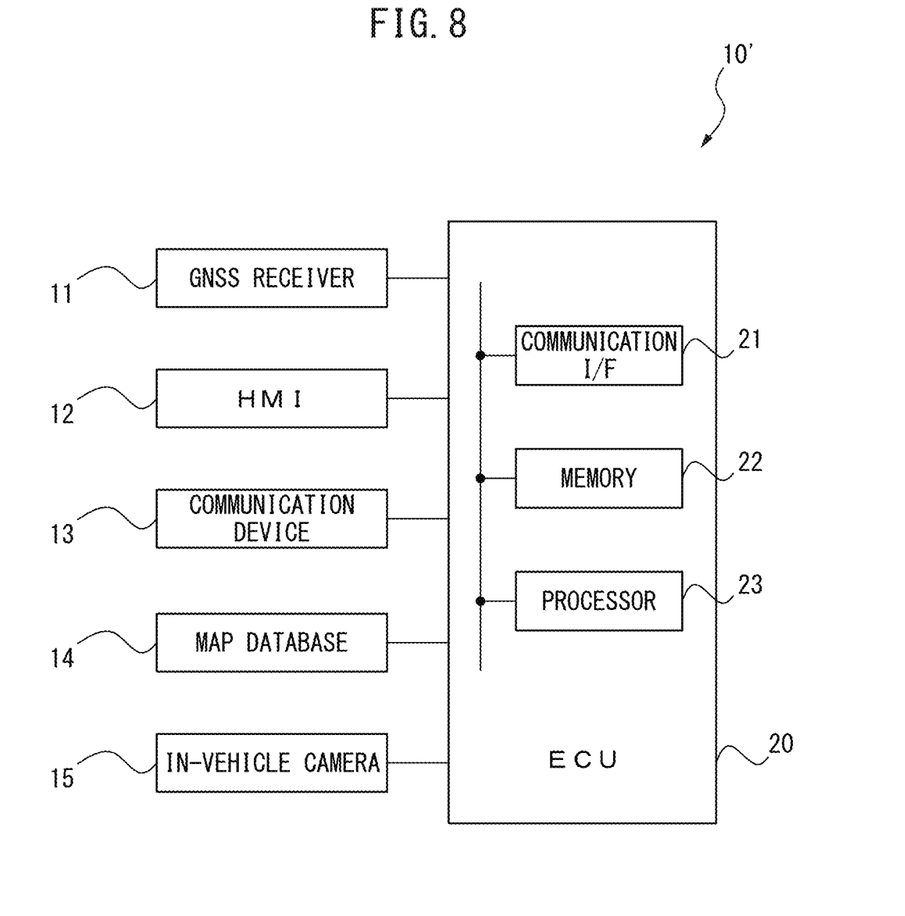
FIG. 8 is a diagram schematically showing a configuration of a vehicle in a third embodiment.

FIG. 8 is a diagram schematically showing a configuration of a vehicle 10' in the third embodiment. In the third embodiment, the vehicle 10' further comprises an in-vehicle camera 15. The in-vehicle camera 15 is communicably connected to the ECU 20 via in-vehicle networks conforming to standards such as the CAN.

The in-vehicle camera 15 is provided inside the vehicle 10' to capture an occupant of the vehicle 10' to produce an image of an occupant of the vehicle 10'. The output of the in-vehicle camera 15, i.e., the image of the occupant of the vehicle 10' generated by the in-vehicle camera 15, is transmitted to the ECU 20.

Incidentally, when a person such as a baby, an infant, or an elderly person who is insufficient in physical strength is included among the occupants of the vehicle 10', it is expected that evacuation at the time of disaster occurrence will become difficult. Therefore, it is desirable to secure communication means to preferentially provide evacuation information with respect to a vehicle on which a person with insufficient physical strength is placed.

Therefore, in the third embodiment, the communication control unit 26 does not restrict the communication from the vehicle 10' to the information distribution server 30 even if the vehicle 10' is located in the disaster-stricken area when a predetermined person of a younger age group or an older age group is included among the occupants of the vehicle 10'. As a result, it is possible to suppress congestion of the communication line due to vehicle communication while ensuring safety of a person whose physical strength is insufficient at the time of occurrence of a disaster.

Figure 9:
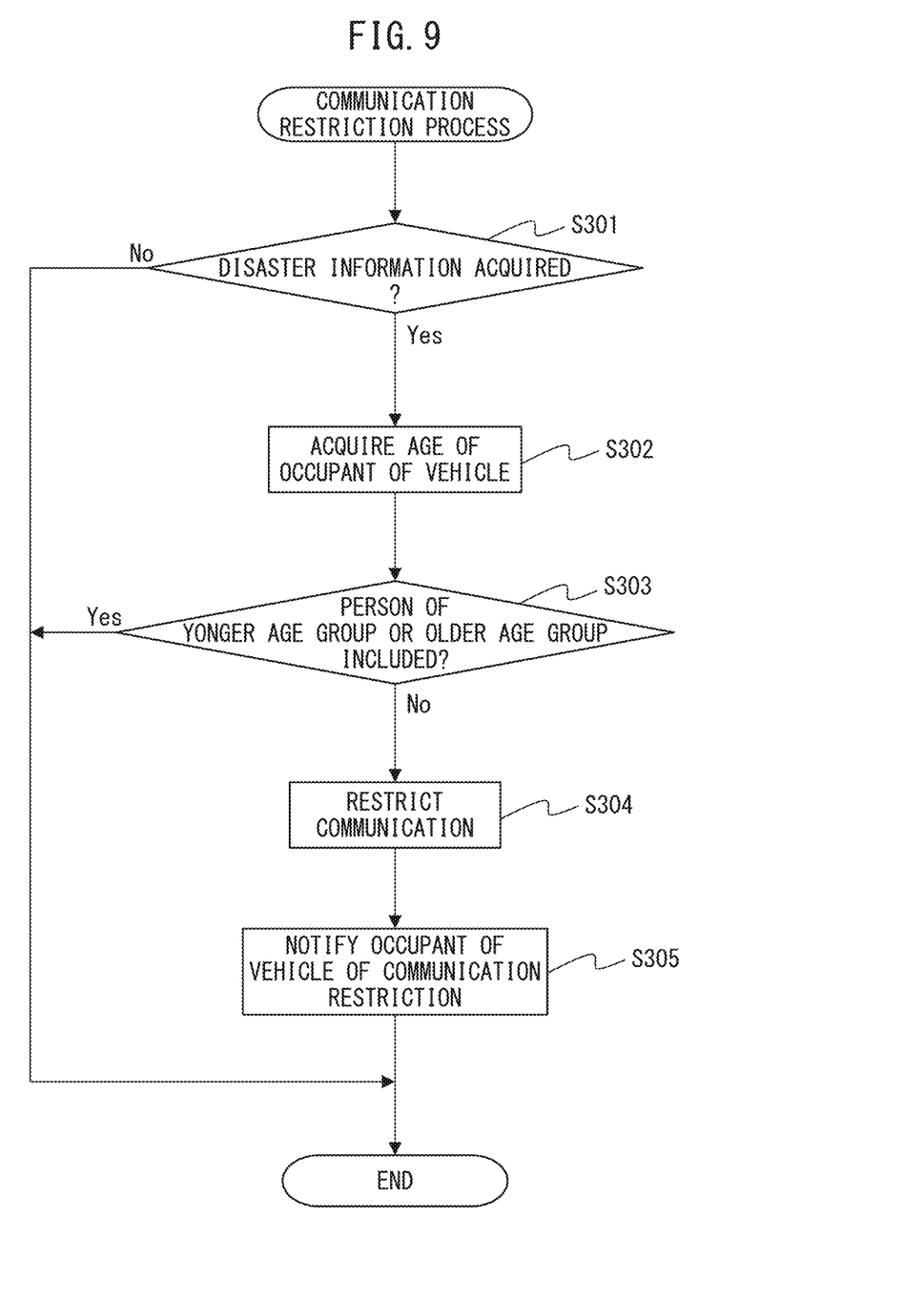
FIG. 9 is a flowchart illustrating a control routine of the communication restriction processing according to the third embodiment.

FIG. 9 is a flowchart illustrating a control routine of the communication restriction processing according to the third embodiment. The control routine is executed by the processor 23 of the ECU 20 in accordance with a computer program stored in the memory 22 of the ECU 20.

First, in step S301, similarly to the step S101 of FIG. 5, the communication control unit 26 determines whether the disaster information about the present position of the vehicle 10' has been acquired by the disaster information acquiring unit 25. If it is determined that the disaster information has not been acquired, the control routine ends. On the other hand, if it is determined that the disaster information has been acquired, the control routine proceeds to step S302.

In step S302, the communication control unit 26 acquires the age of the occupant of the vehicle 10'. For example, the communication control unit 26 acquires the age of the occupant of the vehicle 10' using a discriminator learned in advance so as to output the estimated age of the occupant from the image of the occupant of the vehicle 10' generated by the in-vehicle camera 15. Examples of such a discriminator include machine learning models such as neural networks, support vector machines, and random forests. Incidentally, the in-vehicle camera 15 is omitted, the communication control unit 26 may acquire the age of the occupant of the vehicle 10' from the occupant information inputted to the HMI 12 by the occupant of the vehicle 10'.

Next, in step S303, the communication control unit 26 determines whether or not the occupant(s) of the vehicle 10' includes a person of a younger age group or a person of an older age group. The younger age group is determined in advance, and is set to, for example, an age of 6 years or less. The older age group is determined in advance, and is set to, for example, an age of 65 years or more. If it is determined that the occupant(s) of the vehicle 10' includes a person of a younger age group or a person of an older age group, the control routine ends. On the other hand, when it is determined that the occupant(s) of the vehicle 10' does not include a person of a younger age group or a person of an older age group, the control routine proceeds to step S304.

In step S304, similarly to step S102 of FIG. 5, the communication control unit 26 restricts the communication from the vehicle 10' to the information distribution server 30. Next, in step S305, similarly to step S103 of FIG. 5, the notification unit 27 notifies the occupant of the vehicle 10' via the HMI 12 that the communication of the vehicle 10' is restricted. After step S305, the control routine ends.

Fourth Embodiment

The configuration and control of the vehicle communication control device according to the fourth embodiment are basically the same as the configuration and control of the vehicle communication control device according to the first embodiment, except for the following points. Therefore, the fourth embodiment of the present disclosure will be described below focusing on portions different from the first embodiment.

In the fourth embodiment, unlike the first embodiment, the vehicle communication control device is provided outside the vehicle 10. Specifically, the information distribution server 30 functions as a vehicle communication control device and restricts communication between the vehicle 10 located in the disaster-stricken area and the information distribution server 30.

Figure 10:
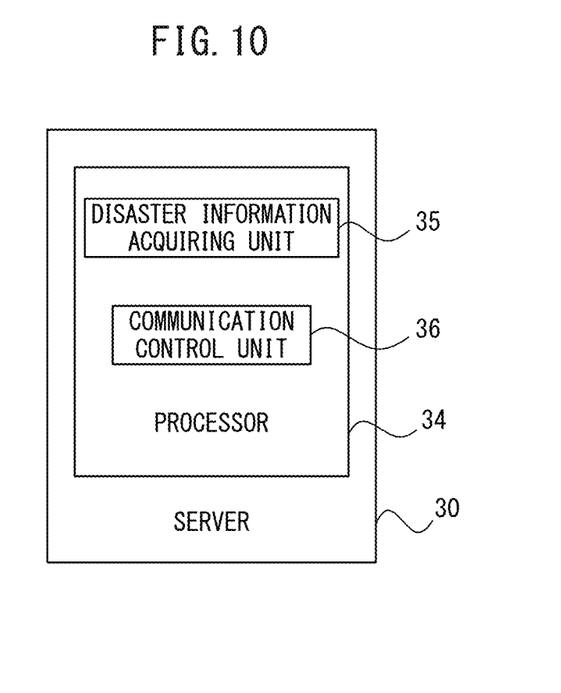
FIG. 10 is a functional block diagram of a processor of the information distribution server according to a fourth embodiment.

FIG. 10 is a functional block diagram of the processor 34 of the information distribution server 30 according to the fourth embodiment. In the fourth embodiment, the processor 34 includes a disaster information acquiring unit 35 and a communication control unit 36. The disaster information acquiring unit 35 and the communication control unit 36 are functional modules implemented by executing a computer program stored in the memory 33 of the information distribution server 30 by the processor 34 of the information distribution server 30. These functional modules may be realized by a dedicated arithmetic circuit provided in the processor 34.

The disaster information acquiring unit 35 acquires disaster information. For example, the disaster information acquiring unit 35 acquires disaster information by receiving disaster information from outside the information distribution server 30 (e.g., a public organization such as the Meteorological Agency or the Ministry of Land, Infrastructure, Transport and Tourism, an electric power company, the vehicle 10, etc.). The disaster information acquiring unit 35 may acquire the disaster information based on an input to the information distribution server 30 by an operator or the like.

The communication control unit 36 controls a communication state between the vehicle 10 and the information distribution server 30. For example, the communication control unit 36 restricts communication between the vehicle 10 and the information distribution server 30 when the vehicle 10 is located in an area where a disaster has occurred, that is, in a disaster-stricken area. More specifically, the communication control unit 36 instructs the vehicle 10 to restrict the communication from the vehicle 10 to the information distribution server 30 when the vehicle 10 is located in the disaster-stricken area. This makes it possible to suppress congestion of the communication line due to vehicle communication in the disaster-stricken area, and thus to reduce occurrence of network congestion in the disaster-stricken area.

Figure 11:
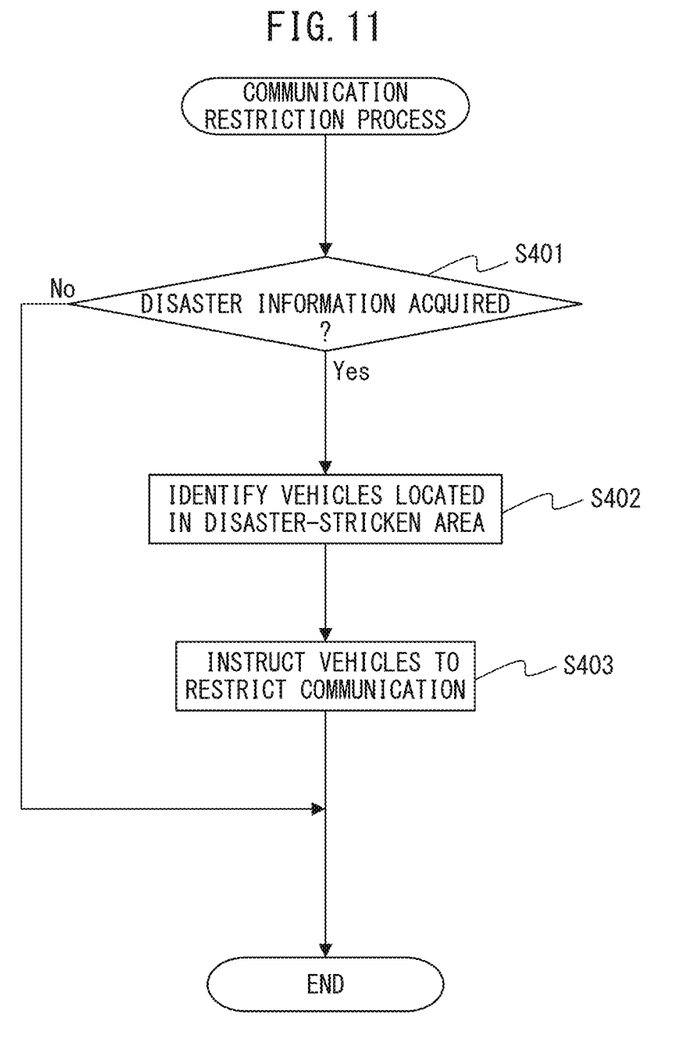
FIG. 11 is a flowchart showing a control routine of the communication restriction process in the fourth embodiment.

Hereinafter, the processing flow of the above-described control will be described with reference to the flowchart of FIG. 11. FIG. 11 is a flowchart showing a control routine of the communication restriction process in the fourth embodiment. The control routine is executed by the processor 34 of the information distribution server 30 in accordance with a computer program stored in the memory 33 of the information distribution server 30.

First, in step S401, the communication control unit 36 determines whether or not the disaster information has been acquired by the disaster information acquiring unit 35. If it is determined that the disaster information has not been acquired, the control routine ends. On the other hand, if it is determined that the disaster information has been acquired, the control routine proceeds to step S402.

In the step S402, the communication control unit 36 identifies the vehicle 10 located in the disaster-stricken area. For example, for each of the plurality of vehicles 10, the communication control unit 36 determines whether or not the vehicle 10 is located in the disaster-stricken area by comparing the current position of the vehicle 10 periodically transmitted from the vehicle 10 to the information distribution server 30 with the position of the disaster-stricken area indicated by the disaster information.

Next, in step S403, the communication control unit 36 instructs the vehicle 10 located in the disaster-stricken area via the communication network 40 and the radio base station 50 to restrict the communication from the vehicle 10 to the information distribution server 30. As a result, the ECU 20 of the vehicle 10 which has received the communication restriction instruction restricts the communication from the vehicle 10 to the information distribution server 30. For example, if vehicle information, such as positional information of the vehicle 10, is periodically transmitted from the vehicle 10 to the information distribution server 30, the ECU 20 reduces the frequency of communication from the vehicle 10 to the information distribution server 30, or the communication speed or communication amount of data transmitted from the vehicle 10 to the information distribution server 30. In addition, the ECU 20 may reduce the communication speed or the communication amount of data transmitted from the vehicle 10 to the information distribution server 30 when the occupant of the vehicle 10 requests to acquire information. In addition, the ECU 20 may stop communication from the vehicle 10 to the information distribution server 30 when restricting communication from the vehicle 10 to the information distribution server 30. After step S403, the control routine ends.

Note that the communication control unit 36 may restrict communication from the information distribution server 30 to the vehicle 10 when the vehicle 10 is located in the disaster-stricken area. In this case, in the step S403, the communication control unit 36, in addition to the instruction of the communication restriction to the vehicle 10 or in place of the instruction of the communication restriction to the vehicle 10, restricts the communication from the information distribution server 30 to the vehicle 10 located in the disaster-stricken area. For example, when transmitting information to the vehicle 10 in response to a request from the vehicle 10 or the like, the communication control unit 36 lowers the communication speed or the communication amount of data transmitted from the information distribution server 30 to the vehicle 10.

Fifth Embodiment

The configuration and control of the vehicle communication control device according to the fifth embodiment are basically the same as the configuration and control of the vehicle communication control device according to the fourth embodiment, except for the following points. Therefore, the fifth embodiment of the present disclosure will be described below focusing on a portion different from the fourth embodiment.

Even if the vehicle 10 is located in a disaster-stricken area, there may be situations in which the communication function of the vehicle 10 should be maintained for evacuation or rescue activities in the disaster-stricken area. Therefore, in the fifth embodiment, with respect to the plurality of vehicles 10 located in the disaster-stricken area, the communication control unit 36 restricts communication between a part of the vehicles 10 (target vehicles for communication restriction) and the information distribution server 30, and does not restrict communication between the remaining vehicles 10 (non-target vehicles for communication restriction) and the information distribution server 30. As a result, it is possible to suppress the occurrence of problems in evacuation or rescue activities in the disaster-stricken areas due to restriction of vehicle communication.

Figure 12:
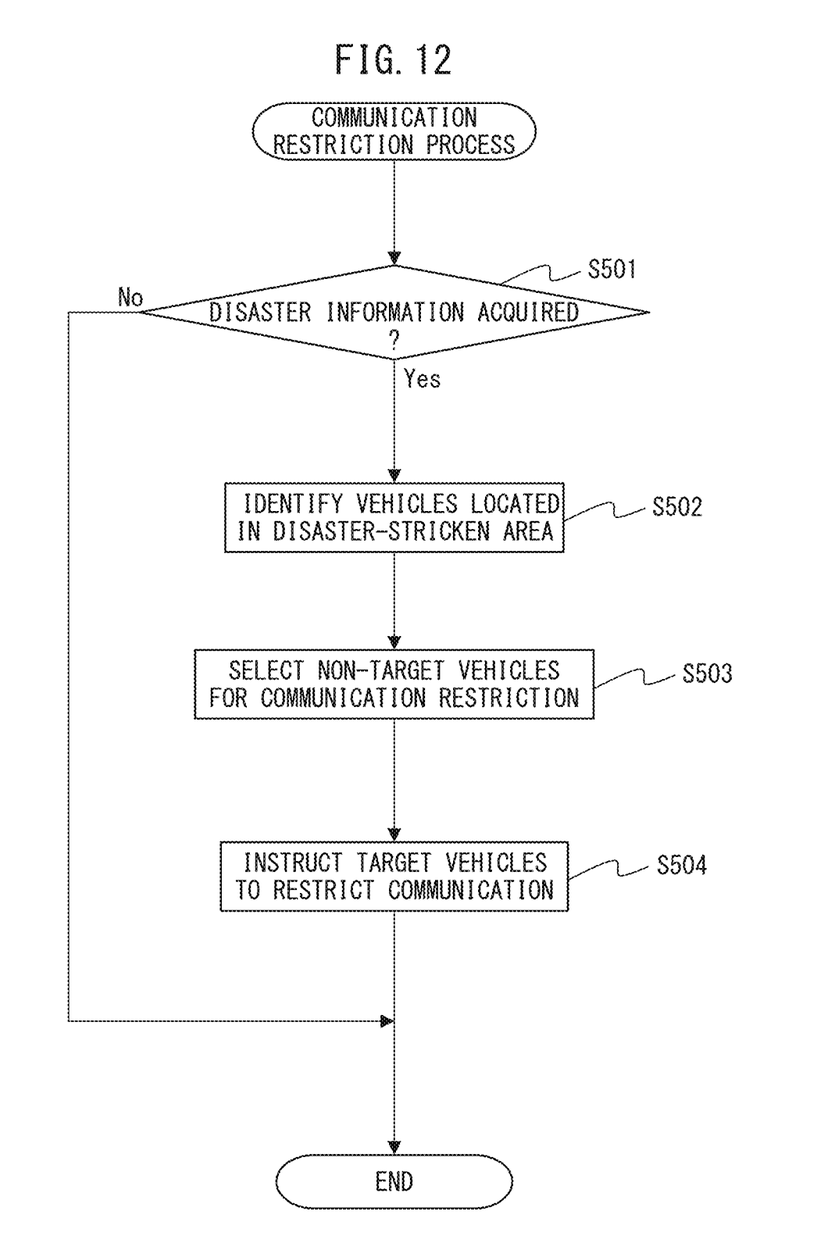
FIG. 12 is a flowchart showing a control routine of the communication restriction process in a fifth embodiment.

FIG. 12 is a flowchart showing a control routine of the communication restriction process in the fifth embodiment. The control routine is executed by the processor 34 of the information distribution server 30 in accordance with a computer program stored in the memory 33 of the information distribution server 30.

First, in step S501, similarly to step S401 in FIG. 11, the communication control unit 36 determines whether or not disaster information has been acquired by the disaster information acquiring unit 35. If it is determined that the disaster information has not been acquired, the control routine ends. On the other hand, if it is determined that the disaster information has been acquired, the control routine proceeds to step S502.

In the step S502, similarly to the step S402 of FIG. 11, the communication control unit 36 identifies the vehicles 10 located in the disaster-stricken area.

Next, in step S503, the communication control unit 36 selects non-target vehicles for communication restriction from the vehicles 10 located in the disaster-stricken area based on the vehicle information (present position, vehicle type, age of occupant, etc.) transmitted from the vehicles 10 to the information distribution server 30. For example, an emergency vehicle that needs to perform stable vehicle communication in a disaster-stricken area is selected as a non-target vehicle. Thus, it is possible to prevent the communication function of the emergency vehicle from being lowered in the disaster-stricken area. Emergency vehicles are vehicles prescribed by the Road Traffic Act, etc. and include, for example, fire engines, ambulances, disaster recovery vehicles, doctor cars, and tow trucks, etc.

Further, as the non-target vehicle, a vehicle on which a person of a younger age group or a person of an older age group is placed may be selected. This makes it possible to preferentially provide information by vehicle communication to a person who is insufficient in physical strength. The younger age group is determined in advance, and is set to, for example, an age of 6 years or less. The older age group is determined in advance, and is set to, for example, an age of 65 years or more.

Further, as the non-target vehicle, a vehicle that can supply power to the outside (e.g., plug-in hybrid vehicle (PHEV), electric vehicle (BEV), fuel-cell vehicle (FCEV), etc.) may be selected. This makes it possible to transmit a power supply instruction or the like to such a vehicle by vehicle communication, and thus it is possible to promote relief activities in the disaster-stricken area.

Alternatively, a vehicle having a degree of damage equal to or greater than a predetermined value may be selected as the non-target vehicle. Due to this, it is possible to provide information preferentially by vehicle communication to the vehicle having a large degree of damage. For example, if the disaster is an earthquake, it is determined that the degree of damage of a vehicle located in a range in which the seismic intensity is equal to or greater than a predetermined value (e.g., seismic intensity 6) is equal to or greater than a predetermined value. If the disaster is a typhoon, it is determined that the degree of damage of the vehicle located in the range in which the wind speed (average for 10 minutes) is equal to or greater than a predetermined value (e.g., 33 m/s) is equal to or greater than a predetermined value. When the current position of the vehicle has not changed for a predetermined period of time or longer, it may be determined that the degree of damage of the vehicle is equal to or greater than a predetermined value.

After the step S503, in the step S504, the communication control unit 36 instructs, via the communication network 40 and the radio base station 50, the target vehicles for the communication restriction, i.e., the vehicles 10 excluding the non-target vehicles from a plurality of vehicles 10 located in the disaster-stricken area, to restrict communication from the vehicle 10 to the information distribution server 30. As a result, the ECU 20 of the vehicle 10 which has received the communication restriction instruction restricts the communication from the vehicle 10 to the information distribution server 30. After step S504, the control routine ends.

It should be noted that network congestion is more likely to occur due to excessive concentration of communications, power outages, etc. when the degree of damage in the disaster-stricken areas is large compared to when the degree of damage in the disaster-stricken areas is small. For this reason, the communication control unit 36 may increase the ratio of target vehicles for communication restriction to the plurality of vehicles 10 located in the disaster-stricken area when the degree of damage in the disaster-stricken area is large, compared to when the degree of damage in the disaster-stricken area is small. As a result, it is possible to apply the communication restriction to an appropriate amount of vehicles according to the degree of damage in the disaster-stricken area.

Further, in the step S504, the communication control unit 36 may restrict the communication from the information distribution server 30 to the target vehicles, instead of or in addition to the instruction to restrict the communication to the target vehicles. For example, when the information is transmitted to the target vehicle in response to a request from the target vehicle or the like, the communication control unit 36 decreases the communication speed or the communication amount of the data transmitted from the information distribution server 30 to the target vehicle.

Other Embodiments

While preferred embodiments of the present disclosure have been described above, the present disclosure is not limited to these embodiments, and various modifications and changes may be made within the scope of the appended claims. For example, in the fourth embodiment or the fifth embodiment, a server other than the information distribution server 30 may function as the vehicle communication control device.

Further, a computer program that causes the computer to realize the respective functional units of the processor 23 of the ECU 20 or the processor 34 of the information distribution server 30 may be provided in a form stored in a computer-readable recording medium. The computer readable recording medium is, for example, a magnetic recording medium, an optical recording medium, or a semiconductor memory.

In addition, the above-described embodiments can be optionally combined and implemented. For example, when the second embodiment and the third embodiment are combined, steps S202 and S203 of FIG. 6 are performed between steps S303 and S304 in the control routine of FIG. 9.

DESCRIPTION OF SYMBOLS 10, 10' Vehicle
20 Electronic control unit ECU)
23 Processor
25 Disaster information acquiring unit
26 Communication control unit
30 Information distribution server
34 Processor
35 Disaster information acquiring unit
36 Communication control unit

The invention claimed is:

1. A vehicle communication control device, comprising a processor configured to:
   acquire disaster information;
   control a communication state between a vehicle and an information distribution server; and
   restrict communication between the vehicle and the information distribution server when the vehicle is located in a disaster-stricken area, wherein
the vehicle communication control device is provided outside the vehicle,
for a plurality of vehicles located in the disaster-stricken area, the processor is configured to
   restrict communication between a part of the vehicles and the information distribution server, and
   not restrict communication between remaining vehicles of the plurality of vehicles and the information distribution server, and
the remaining vehicles include an emergency vehicle.

2. The vehicle communication control device according to claim 1, wherein
the processor is configured to instruct the vehicle to restrict communication from the vehicle to the information distribution server when the vehicle is located in the disaster-stricken area.

3. The vehicle communication control device according to claim 1, wherein
the processor is configured to restrict communication from the information distribution server to the vehicle when the vehicle is located in the disaster-stricken area.

4. The vehicle communication control device according to claim 1, wherein
the processor is configured to increase a ratio of the part of the vehicles to the plurality of vehicles when a degree of damage in the disaster-stricken area is large compared to when the degree of damage in the disaster-stricken area is small.

5. The vehicle communication control device according to claim 1, wherein
the remaining vehicles further include a vehicle having a degree of damage equal to or greater than a predetermined value.

6. A vehicle communication control method executed by a computer, the method comprising:

obtaining disaster information;

restricting communication between a vehicle and an information distribution server when the vehicle is located in a disaster-stricken area; and for a plurality of vehicles located in the disaster-stricken area, restricting communication between a part of the vehicles and the information distribution server, and not restricting communication between remaining vehicles of the plurality of vehicles and the information distribution server, wherein the computer being a vehicle communication control device is provided outside the vehicle, and the remaining vehicles include an emergency vehicle.

7. A non-transitory recording medium having recorded thereon a computer program for vehicle communication control, the computer program causing a computer to:

obtain disaster information;

restrict communication between a vehicle and an information distribution server when the vehicle is located in a disaster-stricken area; and for a plurality of vehicles located in the disaster-stricken area, restrict communication between a part of the vehicles and the information distribution server, and not restrict communication between remaining vehicles of the plurality of vehicles and the information distribution server, wherein the computer being a vehicle communication control device is provided outside the vehicle, and the remaining vehicles include an emergency vehicle.

* * * * *